United States Patent
Kim et al.

(10) Patent No.: US 9,853,723 B2
(45) Date of Patent: Dec. 26, 2017

(54) OPTICAL NETWORK SYSTEM

(71) Applicant: SOLID, INC., Seongnam-si, Gyeonggi-do (KR)

(72) Inventors: Tae Hyeong Kim, Anyang-si (KR); Jong Yeong Lim, Goyang-si (KR); Jongsin Kim, Yongin-si (KR); Eunho Lee, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 14/786,462

(22) PCT Filed: Sep. 24, 2013

(86) PCT No.: PCT/KR2013/008522
§ 371 (c)(1),
(2) Date: Oct. 22, 2015

(87) PCT Pub. No.: WO2014/175516
PCT Pub. Date: Oct. 30, 2014

(65) Prior Publication Data
US 2016/0127035 A1    May 5, 2016

(30) Foreign Application Priority Data
Apr. 23, 2013 (KR) .......... 10-2013-0044767

(51) Int. Cl.
*G02F 1/00*   (2006.01)
*H04B 10/038*   (2013.01)
*H04B 10/032*   (2013.01)

(52) U.S. Cl.
CPC ......... *H04B 10/038* (2013.01); *H04B 10/032* (2013.01)

(58) Field of Classification Search
CPC ........ H04J 3/1652; H04J 14/0227; H04J 3/14; H04J 14/0267; H04L 12/5695;
(Continued)

(56) References Cited

U.S. PATENT DOCUMENTS

| | | | | |
|---|---|---|---|---|
| 5,740,157 A | * | 4/1998 | Demiray | H04J 3/14 370/219 |
| 6,760,302 B1 | * | 7/2004 | Ellinas | H04L 1/22 370/228 |

(Continued)

FOREIGN PATENT DOCUMENTS

| | | |
|---|---|---|
| KR | 10-0243661 B1 | 9/1998 |
| KR | 20-0182553 Y1 | 7/1999 |

(Continued)

OTHER PUBLICATIONS

International Search Report of PCT/KR2013/008522, dated Jan. 20, 2014. [PCT/ISA/210].

(Continued)

*Primary Examiner* — Don N Vo
(74) *Attorney, Agent, or Firm* — Sughrue Mion, PLLC (57) ABSTRACT

Disclosed is an optical network system including a upper network equipment, a lower network equipment, and a plurality of transfer network equipments connecting the upper network equipment and the lower network equipment through independent optical links, wherein the lower network equipment performs switching such that transmission and reception of an optical signal are performed through an optical link of a standby line when a failure occurs in at least one of an optical link used as a working line, an optical interface device associated with the working line in the upper network equipment, and a transfer network equipment associated with the working line.

19 Claims, 9 Drawing Sheets

(58) Field of Classification Search
CPC ... H04L 47/15; H04L 47/724; H04L 41/0896; H04Q 11/0005; H04Q 2011/0086
USPC .......................................................... 398/5
See application file for complete search history.

(56) References Cited

U.S. PATENT DOCUMENTS

| | | | |
|---|---|---|---|
| 9,461,880 B2* | 10/2016 | Saltsidis | ............ H04L 41/0668 |
| 2008/0215910 A1 | 9/2008 | Gabriel et al. | |
| 2008/0298803 A1 | 12/2008 | Warner et al. | |
| 2012/0141123 A1* | 6/2012 | Xie | ...................... H04J 3/1652 |
| | | | 398/43 |
| 2013/0021918 A1 | 1/2013 | Fiorone et al. | |
| 2014/0161446 A1* | 6/2014 | Lee | ..................... H04J 14/0221 |
| | | | 398/34 |

FOREIGN PATENT DOCUMENTS

| | | |
|---|---|---|
| KR | 10-2004-0000096 A | 1/2004 |
| KR | 10-2005-0046703 A | 5/2005 |
| KR | 10-0653188 B1 | 6/2006 |
| KR | 10-0833504 B1 | 5/2008 |
| KR | 10-2010-0043169 A | 4/2010 |
| KR | 10-2010-0127901 A | 12/2010 |

OTHER PUBLICATIONS

Written Opinion of PCT/KR2013/008522, dated Jan. 20, 2014. [PCT/ISA/237].
Extended European Search Report issued in corresponding European Application No. 13883335.5 dated Oct. 31, 2016.

\* cited by examiner

RELATED ART

FIG. 1

RELATED ART

OPTICAL NETWORK SYSTEM

CROSS REFERENCE TO RELATED APPLICATIONS

This application is a National Stage of International Application No. PCT/KR2013/008522, filed Sep. 24, 2013, and claims priority from Korean Patent Application No. 10-2013-0044767 filed Apr. 23, 2013, the contents of which are incorporated herein by reference in their entireties.

BACKGROUND

1. Field

The inventive concept relates to an optical network system to which a network duplication way is applied.

2. Description of Related Art

In recent years, there have been popularized optical network systems, such as FTTH (Fiber to The Home), FTTB (Fiber to The Building), FTTC (Fiber to The Curb), etc., in which optical cables are installed to the subscriber's in-home network, in order to provide a high-speed and large capacity service to a subscriber as a high-speed internet service.

Figure 1:
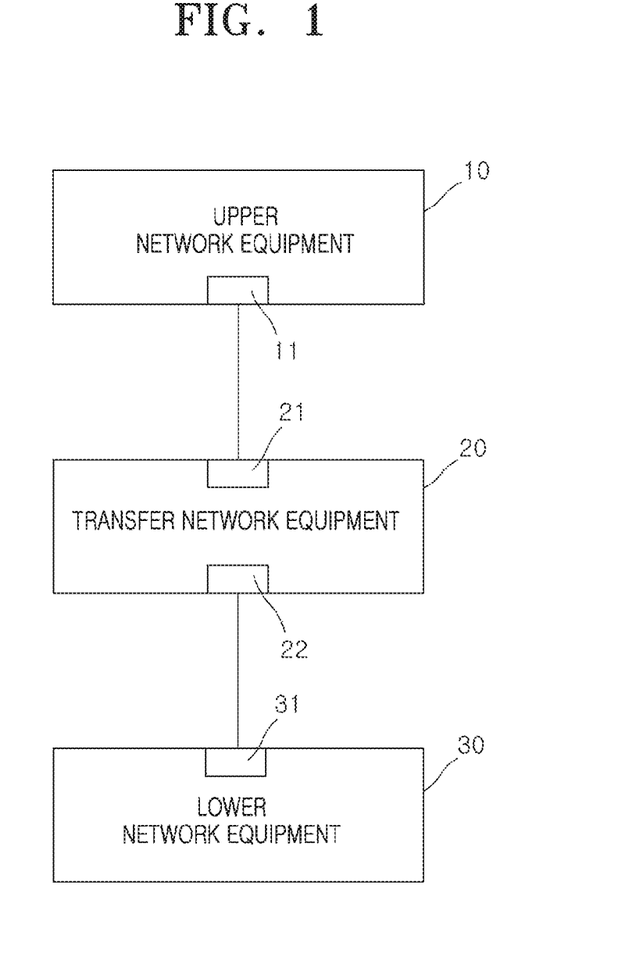
FIG. 1 is a diagram for describing a configuration of an optical network system having a single optical link according to the prior art.
Figure 6:
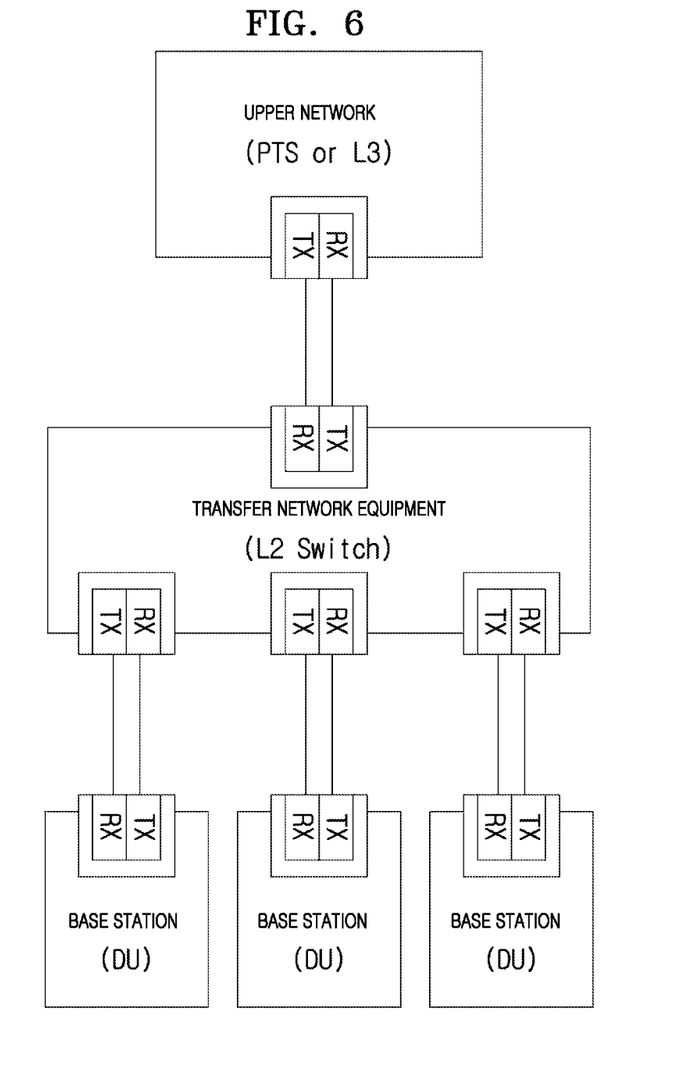
FIG. 6 is a diagram for describing a configuration a transfer network of a base station having one upper link according to the prior art.

FIG. 1 illustrates a configuration of an active optical network system having a single optical link according to the prior art. Referring to FIG. 1, an upper network equipment 10 and a lower network equipment 30 are communicatively connected to each other through a transfer network equipment 20. For the above configuration, the network equipments 10, 20, and 30 are respectively provided with optical interface devices 11, 21, 22 and 31. However, in an optical network system having a single optical link as in FIG. 1, a transfer network cannot be duplicated. Therefore, when a failure occurs in the transfer network, there is a problem that a service is not sustainable until the failure is restored. The problem also exists in a network configuration of FIG. 6. Here, FIG. 6 illustrates an example in which the optical network configuration having a single link of FIG. 1 is applied to a base station transfer network.

Figure 2:
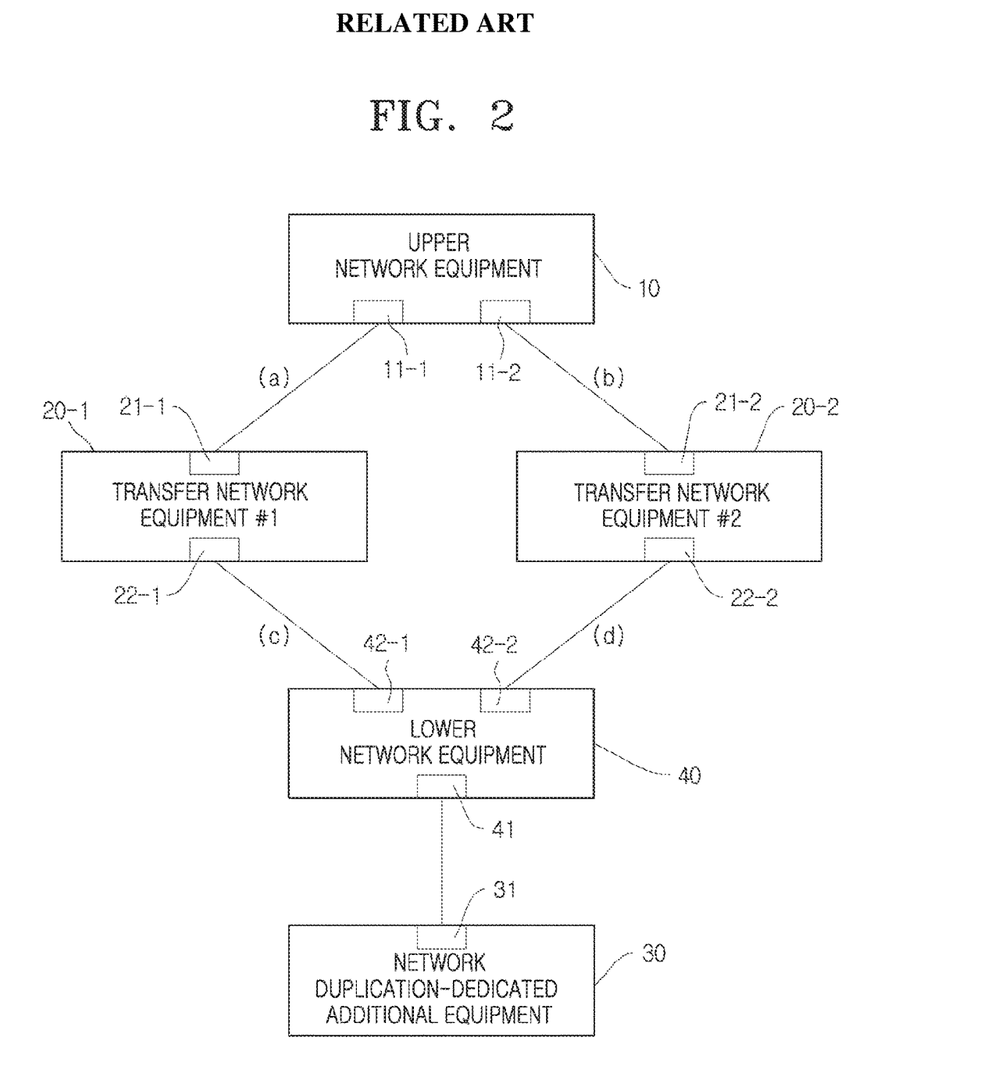
FIG. 2 is a diagram for describing network duplication using the network duplication-dedicated additional equipment according to the prior art.

In order to solve the aforementioned problem, as illustrated in FIG. 2, there has been proposed a method of using a network duplication-dedicated additional equipment in the prior art. FIG. 2 is a diagram for describing network duplication using the network duplication-dedicated additional equipment according to the prior art. Referring to FIG. 2, two transfer network equipments 20-1 and 20-2 are provided and a network duplication-dedicated additional equipment 40 for duplication connection with the lower network equipment 30 is further provided in order to duplicate the transfer network. In this case, the network equipments 10, 20-1, 20-2, 30 and 40 are respectively provided with optical interface devices 11-1, 11-2, 21-1, 21-2, 22-1, 22-2, 31, 41, 42-1, and 42-2 for communication connection as described above. According to the aforementioned network configuration, when a failure occurs in a working line (see reference symbols (a) and (c) in FIG. 2, for example), a service is continuously provided through a bypass path (see reference symbols (b) and (d) in FIG. 2).

However, the network configuration as in FIG. 2 necessarily requires an additional equipment for connection between the lower network equipment having a single link and the duplicated transfer network equipment (that is, the network duplication-dedicated additional equipment 40). Also, the network duplication-dedicated additional equipment 40 is capable of determining a failure occurring in an optical line (that is, reference symbols (c) and (d) in FIG. 2) between duplicated transfer networks, but occasionally does not detect a failure of an upper link (that is, reference symbols (a) and (b) in FIG. 2). Also, the network duplication-dedicated additional equipment 40 hardly detects a logical failure (for example, looping phenomenon) occurring in the transfer network equipments 20-1 and 20-2 themselves.

SUMMARY

According to an aspect of the inventive concept, an optical network system including an upper network equipment, a lower network equipment, and a plurality of transfer network equipments connecting the upper network equipment and the lower network equipment through independent optical links, wherein each of the plurality of transfer network equipments includes: an upper link optical interface device configured to perform transmission and reception of an optical signal to and from the upper network equipment and a lower link optical interface device configured to transmission and reception of an optical signal to and from the lower network equipment; an upper link monitoring unit configured to monitor whether an upper link failure occurs based on a reception signal received by an optical receiver of the upper link optical interface device, the upper link failure including a failure occurring in at least one of an optical link used as a working line with the upper network equipment and an optical interface device associated with the optical link as the working line in the upper network equipment; and a packet control unit configured to perform control such that a report signal associated with the upper link failure is transmitted to the lower network equipment based on a monitoring result of the upper link monitoring unit, and wherein the lower network equipment includes a line control unit configured to switch a transmission and reception link of the optical signal to an optical link of a standby line when the report signal associated with the upper link failure is received from the transfer network equipment associated with the working line.

According to example embodiments, wherein the lower network equipment may include a network duplication-dedicated optical interface device, and wherein the network duplication-dedicated optical interface device may include a first optical transmission/reception unit for transmitting and receiving an optical signal to and from one of the plurality of transfer network equipments and a second optical transmission/reception unit for transmitting and receiving an optical signal to and from another of the plurality of transfer network equipments, the network duplication-dedicated optical interface device may be a single dual-port optical module.

According to example embodiments, wherein the upper link monitoring unit and the packet control unit may be included in the upper link optical interface device, and wherein the upper link optical interface device may be a single optical module including an optical transmitter, the optical receiver, the upper link monitoring unit, and the packet control unit.

According to example embodiments, wherein the upper link monitoring unit may monitor a failure of an optical link with the upper network equipment or a failure of an optical interface device of the upper network equipment based on at least one of information of physical optical loss of a reception signal and information of whether a synchronization signal for maintaining system synchronization between network equipments is received.

According to example embodiments, wherein the upper link monitoring unit further monitors whether a logical failure occurs in the transfer network equipment itself based on the reception signal, and wherein the packet control unit stops transmission and reception of the optical signal associated with a service packet to and from the upper network equipment through the upper link optical interface device when the logical failure occurs.

According to example embodiments, wherein the logical failure may include a looping failure in the transfer network equipment itself, and wherein the upper link monitoring unit may monitor whether the looping failure occurs based on whether a source is identical to a destination in a MAC address of the reception signal.

According to example embodiments, wherein the logical failure may include a looping failure in the transfer network equipment itself, and wherein the upper link monitoring unit may monitor whether the looping failure occurs based on whether a source is identical to a destination in a MAC address of the reception signal.

According to example embodiments, wherein the lower network equipment may include a lower link monitoring unit configured to monitor whether a failure occurs in a lower link which is an optical link between the transfer network equipment and the lower network equipment, and wherein the line control unit may switch a transmission and reception link of the optical signal to an optical link of a standby line when a lower link failure is detected based on a result of monitoring of the lower link monitoring unit.

According to example embodiments, wherein the lower link monitoring unit may monitor whether the lower link failure occurs based on at least one of information of physical optical loss of a reception signal received through the lower link and information of whether a synchronization signal for maintaining system synchronization between network equipments is received.

According to example embodiments, wherein the synchronization signal for maintaining system synchronization between network equipments may be a network timing packet (NTP) or a K28.5 code.

According to example embodiments, wherein the lower link monitoring unit may further monitor whether a looping failure occurs in the transfer network equipment itself connected thereto through the lower link according to whether a source is identical to a destination in a MAC address of a reception signal received through the lower link, and wherein the line control unit may switch a transmission and reception link of the optical signal to an optical link of a standby line when the looping failure is detected in the transfer network equipment itself based on a result of monitoring of the lower link monitoring unit.

According to another aspect of the inventive concept, a transfer network equipment for connecting an upper network equipment and a lower network equipment, comprising: a first optical interface for mounting of an upper link optical interface device which performs transmission and reception of an optical signal to and from the upper network equipment and a second optical interface for mounting of a lower link optical interface device which performs transmission and reception of an optical signal to and from the lower network equipment; an upper link monitoring unit configured to monitor whether an upper link failure occurs based on a reception signal received by the upper link optical interface device, the upper link failure including a failure occurring in at least one of an optical link of the upper network equipment and an optical interface device of the upper network equipment associated to the optical link; and a packet control unit configured to transmit a report signal associated with the upper link failure to the lower network equipment based on a monitoring result of the upper link monitoring unit such that a transmission and reception link of the optical signal is switched to an optical link of a standby line by the lower network equipment when the upper link failure occurs.

According to example embodiments, wherein the upper link monitoring unit may monitor a failure of an optical link with the upper network equipment or a failure of an optical interface device of the upper network equipment based on at least one of information of physical optical loss of a reception signal and information of whether a synchronization signal for maintaining system synchronization between network equipments is received.

According to example embodiments, wherein the synchronization signal for maintaining system synchronization between network equipments may be a network timing packet (NTP) or a K28.5 code.

According to example embodiments, wherein the upper link monitoring unit may further monitor whether a logical failure occurs in the transfer network equipment itself based on the reception signal, and wherein the packet control unit may stop transmission and reception of the optical signal associated with a service packet to and from the upper network equipment through the upper link optical interface device when the logical failure occurs.

According to example embodiments, wherein the packet control unit may transmit a report signal associated with occurrence of the logical failure through an optical transmitter of the upper link optical interface device to the upper network equipment when the logical failure occurs.

According to still another aspect of the inventive concept, a lower network equipment connected to an upper network equipment through a plurality of transfer network equipments respectively via independent optical links, comprising: a single optical interface for transmission and reception of an optical signal with one of the plurality of transfer network equipments and transmission and reception of an optical signal with another of the plurality of transfer network equipments; and a network duplication-dedicated optical interface device mounted on the single optical interface and manufactured as a single dual-port optical module, wherein the network duplication-dedicated optical interface device includes: a first optical transmission/reception unit for transmitting and receiving an optical signal to and from one of the plurality of transfer network equipments and a second optical transmission/reception unit for transmitting and receiving an optical signal to and from another of the plurality of transfer network equipments; a lower link monitoring unit configured to monitor whether a failure occurs in a lower link which is an optical link between the transfer network equipment and the lower network equipment; and a line control unit configured to perform switching control such that transmission and reception of the optical signal are performed through an optical link of a standby line when a lower link failure is detected based on a result of monitoring of the lower link monitoring unit or when a report signal associated with the upper link failure is received from the transfer network equipment connected to an optical link of a working line, the upper link failure including a failure occurring in at least one of an optical link of a working line between the upper network equipment and the transfer network equipment and an optical interface device connected to the optical link in the upper network equipment.

According to example embodiments, wherein the first optical transmission/reception unit and the second optical transmission/reception unit may be manufactured as a bi-directional type in which an optical transmitter and an optical receiver are integrated into one body.

According to example embodiments, wherein the lower link monitoring unit may monitor whether the lower link failure occurs based on at least one of information of physical optical loss of a reception signal received through the lower link and information of whether a synchronization signal for maintaining system synchronization between network equipments is received.

According to example embodiments, wherein the lower link monitoring unit may further monitor whether a looping failure occurs in the transfer network equipment itself connected thereto through the lower link according to whether a source is identical to a destination in a MAC address of a reception signal received through the lower link, and wherein the line control unit may switch a transmission/reception link of the optical signal to an optical link of a standby line when the looping failure is detected in the transfer network equipment itself.

DETAILED DESCRIPTION OF EXEMPLARY EMBODIMENTS

While the inventive concept is susceptible to various modifications and alternative forms, specific exemplary embodiments thereof have been shown by way of example in the drawings and are herein described in detail. It should be understood, however, that the description herein of specific embodiments is not intended to limit the inventive concept to the particular forms disclosed, but, on the contrary, the present intention is to cover all modifications, equivalents, and/or alternatives that fall within the spirit and scope of the inventive concept as defined by the appended claims.

In the following description of embodiments, detailed descriptions of well-known technologies will be omitted since they would unnecessarily obscure the subject matters of the inventive concept. Also, ordinal numbers used therein, such as first and second, are only reference signs only to discriminate one element from another element.

In the specification, when it is mentioned that a signal, data, a message, or the like is "transmitted" or "received" between one element and another element or one element is "connected to" or "coupled to" another element, it should be understood that a signal, data, a message, or the like is directly transmitted or received between one element and another element or one element is directly connected or coupled to another element, but unless explicitly described to the contrary, a signal, data, a message, or the like may be transmitted or received between one element and another element through still another element or one element may be connected or coupled to another element through still another element.

Hereinafter, an optical network system to which a network duplication way is applied, according to embodiments of the inventive concept, will be described in detail with reference to the accompanying drawings.

Figure 3:
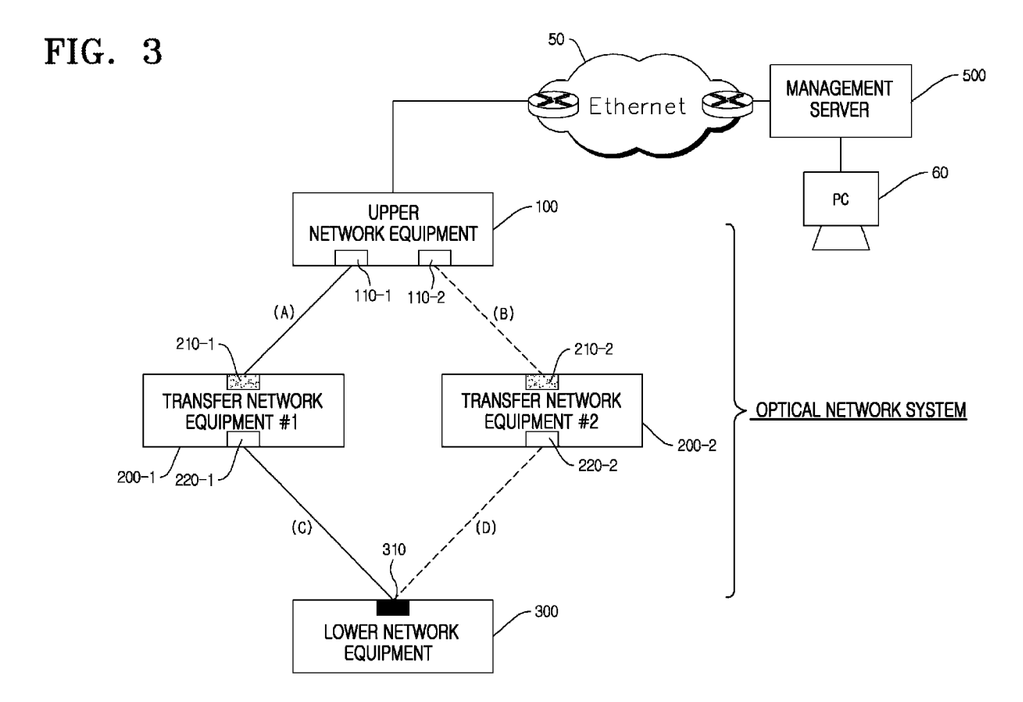
FIG. 3 is a diagram for describing an optical network system to which a network duplication way is applied according to an embodiment of the inventive concept.

FIG. 3 is a diagram for describing an optical network system to which a network duplication way is applied according to an embodiment of the inventive concept.

Referring to FIG. 3, the optical network system according to the embodiment of the inventive concept includes an upper network equipment 100, a plurality of transfer network equipments 200-1 and 200-2, and a lower network equipment 300.

In order for network duplication, the plurality of transfer network equipments 200-1 and 200-2 are connected to the upper network equipment 100 respectively through independent optical links (see reference symbols (A) and (B) in FIG. 3), and are connected to the lower network device 300 respectively through independent optical links (see reference symbols (C) and (D) in FIG. 3). Although two transfer network equipments are illustrated as being provided for network duplication (that is, there is one standby line) in the present embodiment, it is obvious that three or more transfer network equipments may be used. That is, a network configuration in which two or more standby lines are provided is possible. In this specification, for convenience and concentration of the description, a description will be given of a case in which one standby line is provided in the embodiment of FIG. 3 (that is, total two transfer network equipments are provided). Optical links indicated by a solid line in FIG. 3 (that is, (A) and (C)) are working lines, and optical links indicated by a dotted line in FIG. 3 (that is, (B) and (D)) are standby lines.

Figure 7:
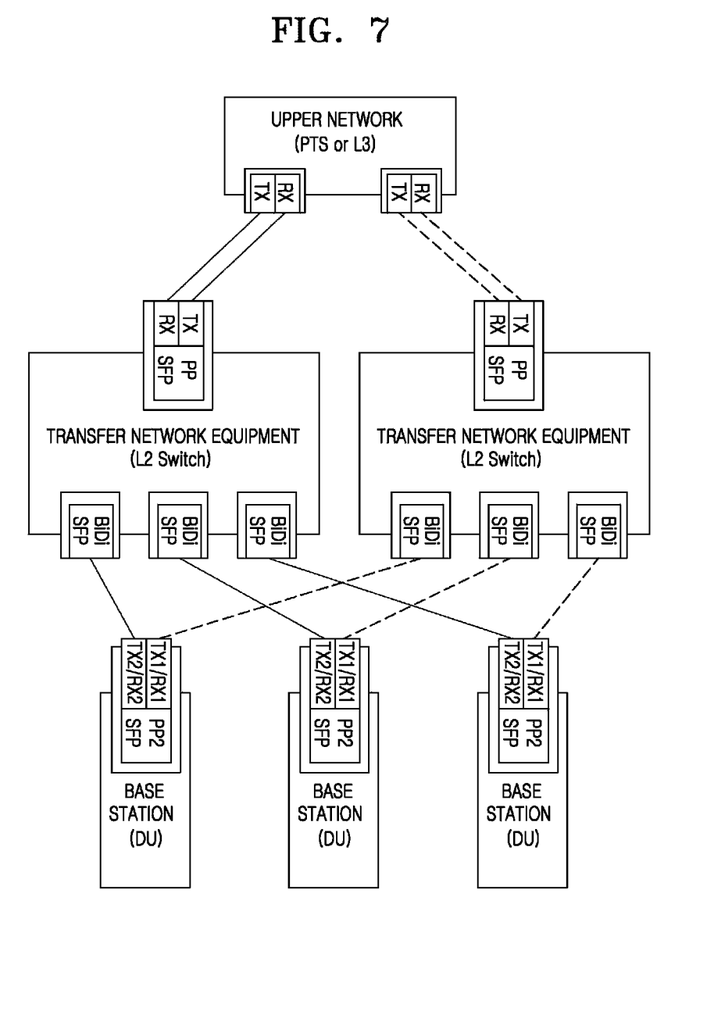
FIG. 7 is a diagram for describing a duplicated configuration of the transfer network of the base station to which a network duplication way is applied according to an embodiment of the inventive concept.

In FIG. 7, there is an embodiment in which an upper network equipment 100 is a packet transport system (PTS) or an L3 (Layer 3), transfer network equipments 200-1 and 200-2 are L2 switches (Layer 2 switches), and a lower network equipment is a distribution unit (DU) (may be a DU in a base station or a DU central station). However, it is obvious that the upper network equipment 100, the transfer network equipments 200-1 and 200-2, and the lower network equipment 300 are not limited to the embodiment illustrated in FIG. 7.

For example, the upper network equipment 100 may function as an optical line termination (OLT) connected to a heterogeneous network, such as the Ethernet (reference numeral 50 in FIG. 3), in an optical subscriber network. The lower network equipment 300 may function as one of a plurality of optical network units (ONU) connected to subscribers. Due to this, there is illustrated a case in which the upper network equipment 100 functions as an OLT in the optical subscriber network and is communicatably connected to a management server 500 and an administrator terminal 60 through the Ethernet 50 being the heterogeneous network. However, in this case, the upper network equipment 100 is not necessarily the OLT directly connected to the heterogeneous network in the overall optical subscriber network. Also, the upper network equipment 100 is not necessarily the ONU directly connected to the subscriber in the optical subscriber network. That is, it is noted that FIGS. 3 and 10 are merely embodiments related to the optical network system to which a network duplication way is applied according to embodiments of the inventive concept, and there is no limitation in a position at which a corresponding network configuration is to be applied in the network, or the like.

Similarly to FIG. 3, the inventive concept is aimed to implement network duplication without a separate additional equipment for network duplication unlike the prior art, while configuring an optical network including a plurality of transfer network equipments 200-1 and 200-2 connecting the upper network equipment 100 and the lower network equipment 300 through independent optical links respectively.

To this end, an embodiment of the inventive concept includes upper link optical interface devices 210-1 and 210-2 mounted on the transfer network equipments 200-1 and 200-2 to perform optical transmission and reception with the upper network equipment 100, a network duplication-dedicated optical interface device 310 mounted on the lower network equipment 300 to perform optical transmission and reception with the transfer network equipments 200-1 and 200-2, realizing network duplication without an additional device unlike the prior art.

Figure 4:
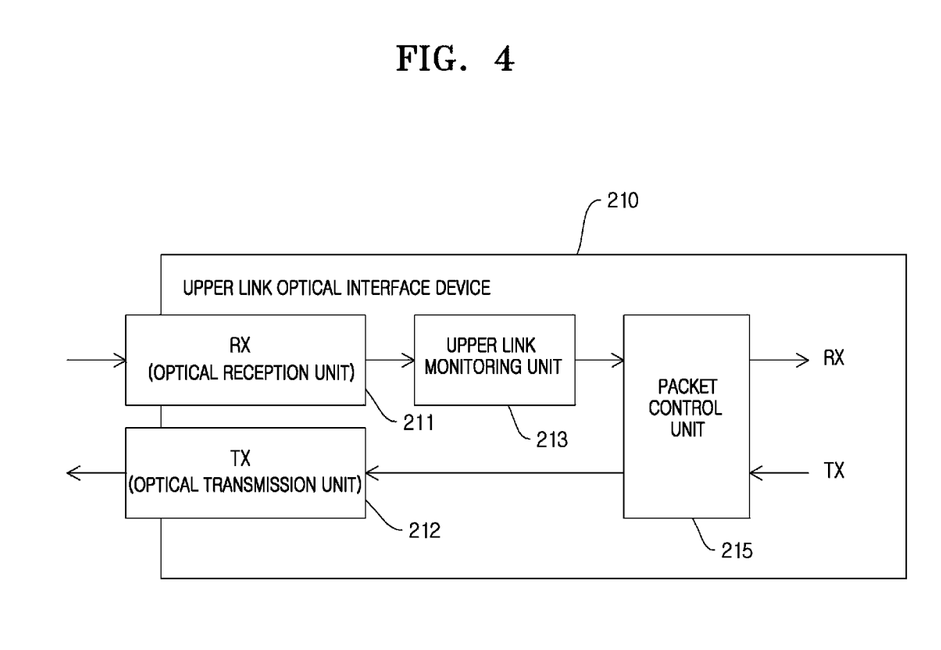
FIG. 4 is a block configuration diagram of an upper link optical interface device mounted on a transfer network equipment according to an embodiment of the inventive concept.

Referring to FIG. 3, the upper link optical interface devices 210-1 and 210-2 respectively mounted on the transfer network equipments 200-1 and 200-2 perform optical communication with optical interface devices 110-1 and 110-2 provided in the upper network equipment 100 through the independent optical links (reference symbols (A) and (B) in FIG. 3) respectively. In the embodiment of the inventive concept, each of the upper link optical interface devices 210-1 and 210-2 may have the configuration of FIG. 4. Throughout the specification, for ease of distinction from a general small form-factor pluggable (SFP) type optical interface device, the upper link optical interface device 210-1 and 210-2 having the configuration of FIG. 4 are referred to as a packet protection SFP (PPSFP). In FIG. 3, the optical interface devices 110-1 and 11-2 mounted on the upper network equipment 100 may be a general SFP type optical interface.

Figure 5:
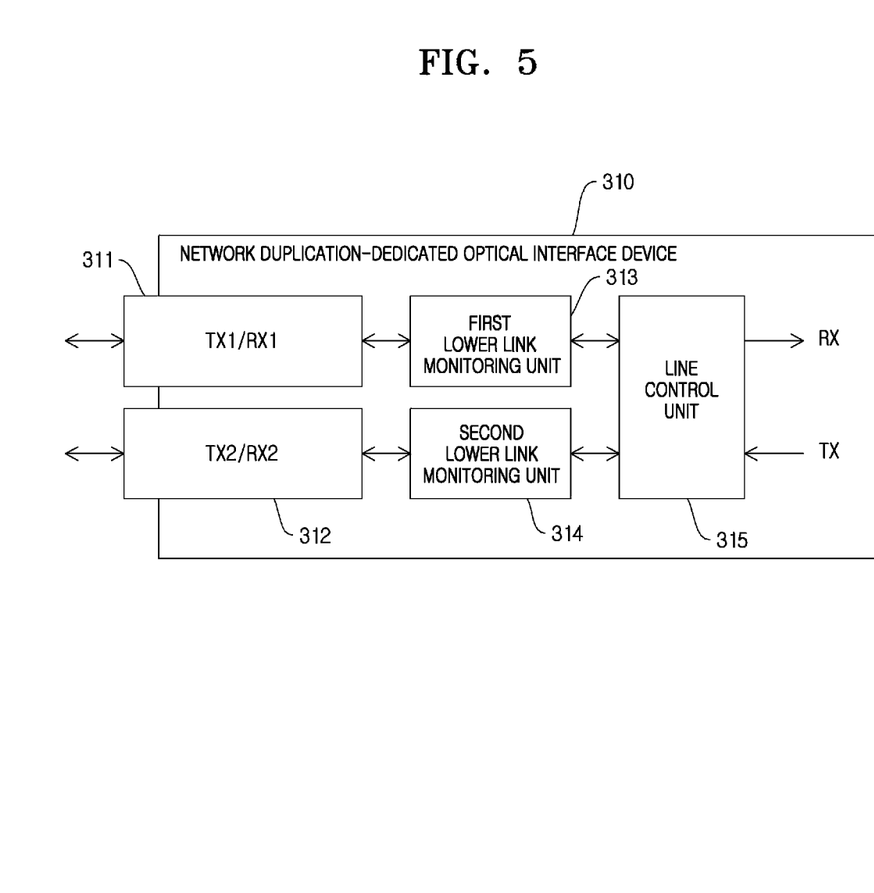
FIG. 5 is a block configuration diagram of a network duplication-dedicated optical interface device mounted on a lower network equipment according to an embodiment of the inventive concept.

Also, the network duplication-dedicated optical interface device 310 which is mounted on the lower network equipment 300 performs optical communication with the optical interface devices (that is, lower link optical interface devices 220-1 and 220-2) provided in the transfer network equipments 200-1 and 200-2 through the independent optical links (see reference symbols (C) and (D) in FIG. 3). In the embodiment of the inventive concept, the network duplication-dedicated optical interface device 310 may have the configuration of FIG. 5. Throughout the specification, for ease of distinction from a general SFP type optical interface device and the PPSFP, the network duplication-dedicated optical interface device 310 having the configuration of FIG. 5 is referred to as a PP2SFP. In FIG. 3, the lower link optical interface devices 220-1 and 220-2 mounted on the transfer network equipments 200-1 and 200-2 may be a general SFP type optical interface.

In the embodiment of the inventive concept, when there occurs a failure in an upper link between the upper network equipment 100 and the transfer network equipment 200-1 or 200-2, a logical failure in the transfer network equipment itself, or a failure in a lower link between the transfer network equipment 200-1 or 200-2 and the lower network equipment 300, a transmission/reception path of an optical signal is switched to an optical link path of a standby line based on the optical interface devices PPSFP and PP2SEP, thereby enabling continuous provision of services. In this case, bypass processing (that is, switching process) to the optical link of the standby line may be performed by the lower network equipment (PP2SFP mounted on the lower network equipment 300 in the embodiment of FIG. 5), which will be understood apparently from the following description with reference to FIGS. 4 and 5.

FIG. 4 is a block configuration diagram of an upper link optical interface device mounted on a transfer network equipment according to an embodiment of the inventive concept, and FIG. 5 is a block configuration diagram of a network duplication-dedicated optical interface device mounted on a lower network equipment according to an embodiment of the inventive concept.

Referring to FIG. 4, an upper link optical interface device (reference numerals 210-1 and 210-2 in FIG. 3, collectively indicated by reference numeral 210 below, and referred to as the acronym "PPSFP") includes an optical reception unit 211, an optical transmission unit 212, an upper link monitoring unit 213, and a packet control unit 215, and may be implemented as a single optical module.

Referring to FIG. 5, a network duplication-dedicated optical interface device (referred to as the acronym "PP2SFP") 310 includes a first optical transmission/reception unit 311, a second optical transmission/reception unit 312, a first lower link monitoring unit 313, a second lower link monitoring unit 314, and a line control unit 315, and may be implemented as a single optical module.

In this case, the first optical transmission/reception unit 311 and the second optical transmission/reception unit 312 may be manufactured in a bi-directional type in which an optical transmission unit and an optical reception unit are integrated. That is, the PP2SFP 310 may be manufactured in such a way that an existing SFP type optical transmission unit and an existing SFP type optical reception unit are integrated into one body so as to perform bi-directional optical transmission/reception and two integrated optical transmission/reception units are integrated into dual ports. In this case, the first optical transmission/reception unit 311 is provided to perform optical transmission/reception with one of a plurality of transfer network equipments 200-1 and 200-2, and the second optical transmission/reception unit 312 is provided to perform optical transmission/reception with the other of a plurality of transfer network equipments 200-1 and 200-2.

Although the first lower link monitoring unit 313 and the second lower link monitoring unit 314 are illustrated as individual blocks in FIG. 5, they may be integrated into one functional block. Such integration implementation may be applied to the lower link monitoring units 313 and 314 and the line control unit 315 in the similar or same manner. Also, although the first optical transmission/reception unit 311 and the second optical transmission/reception unit 312 are illustrated as being mounted on a single optical module in FIG. 5, it is also possible that they are mounted on individual optical modules (in this case, interfaces for mounting of the respective optical modules are also be provided in the lower network equipment). That is, any two or more components illustrated in FIGS. 4 and 5 may be integrated into one module and any one component may be divided into functional sub-blocks. That is, the above configuration is merely design modification, and the inventive concept is not limited thereto.

In embodiments of the inventive concept, the PPSFP 210 and the PP2SFP 310 may be manufactured to have full compatibility at a host interface portion and an optical cable connection portion such that they may be used instead of an existing SFP. Therefore, network duplication can be realized without a separate additional equipment and a failure monitoring function and a switching function can be provided by merely connecting the PPSFP 210 and the PP2SFP 310 having the above configurations to general optical interface terminals of an existing network equipment (that is, by connecting the PPSFP to an uplink port of an existing transfer network equipment and connecting the PP2SFP to an uplink port of an existing lower network equipment). A description thereof will be given according to types of failures.

Upper Link Failure Monitoring and Switching

In embodiments of the inventive concept, upper link failure monitoring may be performed by the upper link monitoring unit 231 of the PPSFP 210. The upper link failure monitoring by the upper link monitoring unit 231 may be realized by the following methods. For convenience and concentration of description, it is assumed that an upper link used as a working line in a duplicated transfer network is the optical link indicated by reference symbol (A) in FIG. 3. Therefore, the upper link monitoring unit 231 which will be described below represents a component within the PPSFP 210-1 which is mounted on the transfer network equipment 200-1 of FIG. 3, which is associated with the working line. In this case, the upper link failure monitoring may be performed in real time or at regular periodic intervals.

As an example, the upper link monitoring unit 231 may monitor an upper link failure based on information of physical optical loss of a reception signal received through an optical link (A) that is a working line. That is, the upper link monitoring unit 231 may determine whether there is an upper link failure based on various parameter values through which optical loss can be determined, such as a case where an optical signal is not received or a case where an intensity of an optical signal is less than a predetermined threshold value.

As another example, the upper link monitoring unit 231 may monitor an upper link failure by information to determine whether a predetermined synchronization signal for maintaining synchronization between network equipments is received, based on the reception signal received through the optical link (A) being the working line although there is no physical optical loss as described above. In this case, as the synchronization signal which is reference to determine whether there is an upper link failure, a K28.5 code or a network timing packet (NTP) may be used when, for example, the Ethernet standard transmission scheme is assumed. That is, the upper link monitoring unit 231 may determine whether there is an upper link failure based on a case where the aforementioned synchronization signal is not received for a predefined reference time.

When the upper link failure is determined according to the aforementioned methods, the packet control unit 215 of the PPSFP 210 performs control such that a report signal associated with the determined upper link failure is transmitted to the lower network equipment 300. The report signal is for informing the lower network equipment of occurrence of the upper link failure. As the report signal, a link loss carry forward (LLCF) defined by the Ethernet standard, another similar-purpose packet or a new packet may be used.

In this case, causes of the upper link failure may include a failure of the link (A) being the working line or a failure of an optical interface device (that is, see reference numeral 110-2 in FIG. 3) of the upper network equipment 100. Therefore, the lower network equipment 300 may determine whether the upper link failure occurs by receiving the aforementioned report signal. When the report signal associated with the upper link failure is received, the line control unit 315 of the PP2SFP 310 mounted on the lower network equipment 300 controls by switching a transmission/reception link of an optical signal to an optical link of a standby line. That is, the line control unit 315 cuts off the optical link of the working line (for example, the optical link indicated by reference symbol (C) in FIG. 3 in this example) and performs switching such that the optical link of the standby line (for example, the optical link indicated by reference symbol (D) in FIG. 3 in this example) is a working line.

The above configuration will be described in detail below by taking a specific example. It is assumed that, in a duplicated network illustrated in FIG. 3, the link (C) is a working line (hereinafter referred to as a "W (Working)"), and the link (D) is a standby line (hereinafter referred to as an "S (Standby)"). In this case, the line control unit 315 of the PP2SFP 310 sets a TX1/RX1 (that is, the first optical transmission/reception unit 311) connected to the link (C) as a W (Working) port and a TX2/RX2 (that is, the second optical transmission/reception unit 312) as a S (Standby) port, and enables communication with a host equipment and a upper network equipment. Thereafter, when an upper link failure (such as a failure in the link (A) in FIG. 3) occurs with respect to the W (Working) line (that is, a report signal associated with the upper link failure is received), the line control unit 315 issues a line switching command to enable communication with the host equipment and the upper network equipment. The above description may be applied to a switching processing procedure caused by occurrence of a lower link failure, which will be described below.

Lower Link Failure Monitoring and Switching

In embodiments of the inventive concept, lower link failure monitoring may be performed by the lower link monitoring units 313 and 314 of the PP2SFP 310. In a broader sense, the lower link failure includes failures in both the link (C) and the link (D) in FIG. 3 but, in this specification, mainly refers to a failure occurring in the link (C) that is a working line. Monitoring the link (D) being a standby link will be separately described below.

As briefly described above, a method of monitoring a failure of the link (C) being a working line (that is, an optical link between a transfer network equipment and a lower network equipment) is substantially identical to a method of monitoring a failure of the link (A) being a working line (that is, an optical link between a upper network equipment and a transfer network equipment) (that is, an upper link failure monitoring method by the upper link monitoring unit 213 of the PPSFP 210). That is, the first lower link monitoring unit 313 connected to a working line in the PP2SFP 310 may determine whether there is a failure in the link (C)

being a working line, based on information of optical loss of a reception signal received through the link (C) or information of whether a synchronization signal is received. When it is determined that there is a lower link failure based on a result of monitoring by the first lower link monitoring unit 313, the line control unit 315 performs control to switch a transmission/reception link of an optical signal to an optical link of a standby line.

According to an embodiment, before the switching to the optical line of the standby link as described above, determination may be made as to whether the optical link of the standby line (that is, the link (D) in the example of FIG. 3) is in a state suitable for transmission and reception of the optical signal. For example, the second lower link monitoring unit 314 of the PP2SFP 310 may check whether the link (D) being the standby line is in a normal state in real time or continuously. To this end, although transmission and reception of a service packet are not performed as in the working line, an optical signal for checking a physical state of an optical link (for example, the aforementioned broadcasted NTP signal) may be continuously received through the standby line. Therefore, the second lower link monitoring unit 314 may check a state of the optical link being the standby line based on whether such a signal is received. In another embodiment of the inventive concept, the line control unit 315 may perform switching control only when the state of the standby line is normal, based on a result of the checking. According to another embodiment, the line control unit 315 may perform control such that checking of the optical link of the standby line is performed by the second lower link monitoring unit 314 only after a failure occurs in an optical link of a working line. That is, the above case corresponds to an embodiment in which checking is not performed in real time or continuously. It is obvious that there are various modifications, besides the embodiment.

Figure 8:
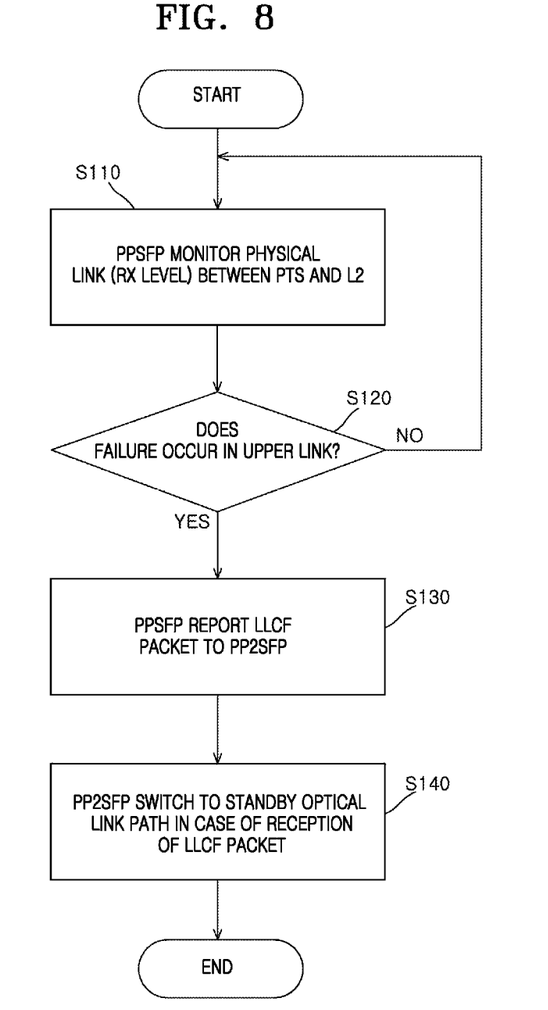
FIG. 8 is a schematic flowchart of a processing procedure in the case of occurrence of a failure in a link between a PTS and an L2 in a duplicated configuration of a base station transfer network of FIG. 7.
Figure 9:
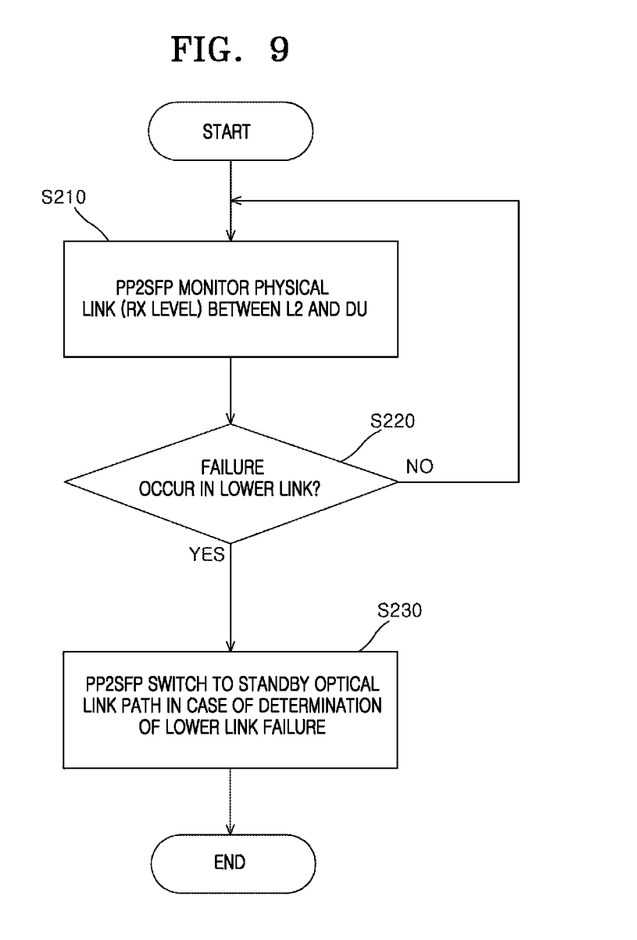
FIG. 9 is a schematic flowchart of a processing procedure in the case of occurrence of a failure in a link between an L2 and a DU in the duplicated configuration of the base station transfer network of FIG. 7.

Schematic flowcharts for the upper link failure monitoring, the lower link failure monitoring, and the line switching are illustrated in FIGS. 8 and 9. FIGS. 8 and 9 illustrate an example in which an LLCF packet defined in the Ethernet standard is used as a report signal on the condition of the embodiment of FIG. 7. Specifically, FIG. 8 illustrates a flowchart of a processing procedure in the case of occurrence of a failure in a link between a PTS and an L2 in a duplicated configuration of a base station transfer network of FIG. 7, and FIG. 9 illustrates a flowchart of a processing procedure in the case of occurrence of a failure in a link between the L2 and a DU in the duplicated configuration of the base station transfer network of FIG. 7.

Referring to FIG. 8, the processing procedure includes a step S110 of monitoring an upper link failure in real time in the PPSFP, steps S120 and S130 of reporting the LLCF packet in the case of failure determination, and a step S140 of performing path switching to a standby line in the PP2SFP. Referring to FIG. 9, the processing procedure includes a step S210 of monitoring a lower link failure in real time in the PP2SFP and steps S220 and S230 of performing path switching to a standby line in the case of failure determination.

The monitoring of the upper link failure and the lower link failure and the line switching caused by the failure have bee described above. A process of monitoring a logical failure in a transfer network equipment itself that is another cause of a transfer network failure and performing switching will be described below.

Monitoring of Logical Failure and Switching in Transfer Network Equipment

According to an embodiment of the inventive concept, it is possible to determine whether a logical failure occurs in a transfer network equipment itself (reference numeral 200-1 in FIG. 3) on the side of a working line in the duplicated transfer network and perform switching to an optical link of a standby line based on the determination. In this regard, a description is given by taking a looping phenomenon, which is one of logical failures of the transfer network equipment, as an example.

When a logical failure, such as looping phenomenon, occurs in the transfer network equipment, a source is identical to a destination in a media access control address (MAC address) of a signal, and therefore, the optical signal is not transferred to an intended destination. According to an embodiment of the inventive concept, when a logical failure, such as looping phenomenon, occurs in the transfer network equipment itself, the PPSFP 210 of the corresponding network equipment determines the logical failure and physically limits a port between an upper network equipment and a transfer network equipment. The logical failure, such as looping phenomenon, may be a cause of reducing network performance since the logical failure causes unnecessary excessive traffic in an upper equipment. To this end, the upper link monitoring unit 213 of the PPSFP 210 may perform monitoring of the logical failure such as the looping phenomenon described above. When it is determined that a logical failure occurs in the transfer network equipment itself as a result of monitoring, the packet control unit 215 of the PPSFP 210 may stop transmission and reception of an optical signal associated with a service packet to/from a upper network equipment. In this case, the packet control unit 215 may report occurrence of the logical failure in the transfer network equipment to the upper network equipment through the optical transmission unit 212 of the PPSFP 210.

In addition to the aforementioned method, when the looping phenomenon occurs as a logical failure in the transfer network equipment itself, a lower network equipment may determine whether the looping phenomenon occurs. For example, the lower link monitoring unit of the PP2SFP 310 (indicated by reference numeral 313 in FIG. 5 associated with a working line in this example) may monitor whether the looping phenomenon occurs in the transfer network equipment itself based on whether a source is identical to a destination in a MAC address of a reception signal received through a lower link (that is, the link (C) in FIG. 3). The cause is as follows. In a case where the looping phenomenon occurs in the transfer network equipment, when a signal transmitted to the upper network equipment 100 by the PP2SFP 310 passes through the transfer network equipment, a source becomes identical to a destination in the signal and thereafter, the signal is returned, based on which it is possible to determine whether the looping phenomenon occurs in the transfer network equipment itself. In this case, the line control unit 315 of the PP2SFP 310 may switch a transmission/reception link of an optical signal to an optical link of a standby line.

Although the looping phenomenon is mainly described as a logical failure of the transfer network equipment itself in the specification, there may be MAC crash, hang up of an equipment itself, or the like. In this case, the MAC crash refers to a case in which a MAC address is set when establishment of an optical link is completed, and thereafter, a value of the MAC address is changed frequently. Also, the hang up refers to a case in which a processor of an equipment cannot perform a normal operation. In these cases, it is possible to determine a logical failure of the equipment itself in such a way to monitor a signal transfer error caused by a change in the MAC address and an abnormal operation of the processor.

As described above, the description has been given with reference to FIGS. 4 and 5 with respect to a case in which a single optical interface device that is a PPSFP or PP2SFP includes both a function of monitoring an upper link failure, a lower link failure, and a logical failure of the transfer network equipment itself and a function of performing line switching when the failure is determined. Depending on needs or design methods of a designer, one or both of the failure monitoring function and the line switching function may be implemented as separate modules outside the optical interface device. That is, when optical transmission and reception functions are implemented in the optical interface device, one or both of the upper link monitoring unit 213 and the packet control unit 215 as described above may be implemented in a part of the transfer network equipment other than the inside of the PPSFP. Similarly, one or all of the lower link monitoring units 313 and 314 and the line control unit 315 may be implemented in a part of the lower network equipment other than the inside of the PP2SFP Although a description is not given, the PPSFP and the PP2SFP may be operated along with the management server 500 of FIG. 3 during network management, and operation states of the PPSFP and the PP2SFP may be monitored through the management server 500. Monitoring of a state of a specific target device through the management server 500 may be made through a health check packet, which corresponds to a management method complied with network standards, and a detail description thereof will be omitted.

While the inventive concept has been described with respect to the specific embodiments, it will be apparent to those skilled in the art that various changes and modifications may be made without departing from the spirit and scope of the invention as defined in the following claims.

The invention claimed is:

1. An optical network system including an upper network equipment, a lower network equipment, and first and second transfer network equipments connecting the upper network equipment and the lower network equipment through independent optical links,
wherein the first transfer network equipment includes:
an upper link optical interface device for transmitting and receiving an optical signal to and from the upper network equipment; and
a lower link optical interface device for transmitting and receiving an optical signal to and from the lower network equipment,
wherein the lower network equipment includes:
a network duplication-dedicated optical interface device for transmitting and receiving an optical signal to and from the first and second transfer network equipments,
wherein the upper link optical interface device includes at least one processor and at least one memory to implement:
an upper link monitoring unit configured to detect at least one of an upper link failure and a transfer network equipment failure based on a reception signal received from the upper network equipment, the upper link failure including a failure related to an optical interface device of the upper network equipment and a failure related to an optical link between the optical interface device of the upper network equipment and the upper link optical interface device, and the transfer network equipment failure including a failure related to a MAC address error generated at the first transfer network equipment; and
a control unit configured to generate a report signal based on a detection result of the upper link monitoring unit, and
wherein the network duplication-dedicated optical interface device includes at least one processor and at least one memory to implement:
a line control unit configured to switch an optical signal transmission/reception path with respect to the upper network equipment from the first transfer network equipment to the second transfer network equipment in response to the report signal received from the first transfer network equipment.

2. The optical network system of claim 1, wherein the network duplication-dedicated optical interface device further includes
a first optical transceiver for transmitting and receiving an optical signal to and from the first transfer network equipment, and a second optical transceiver for transmitting and receiving an optical signal to and from the second transfer network equipment.

3. The optical network system of claim 1, wherein the upper link monitoring unit detects the upper link failure based on at least one of a degree physical optical loss of the reception signal and whether a synchronization signal for maintaining synchronization between the upper network equipment, the first and second transfer network equipment, and the lower network equipment is received.

4. The optical network system of claim 1,
wherein, when the transfer network equipment failure is detected by the upper link monitoring unit, the control unit stops transmission and reception of an optical signal to and from the upper network equipment through the upper link optical interface device.

5. The optical network system of claim 1,
wherein the upper link monitoring unit detects the transfer network equipment failure based on whether a source is identical to a destination in a MAC address of the reception signal.

6. The optical network system of claim 1, wherein, when the transfer network equipment failure is detected by the upper link monitoring unit, the control unit transmits the report signal to the upper network equipment through an optical transmitter of the upper link optical interface device.

7. The optical network system of claim 1, wherein the network duplication-dedicated optical interface device further includes a lower link monitoring unit configured to detect a lower link failure based on the reception signal received from the upper network equipment through the first transfer network equipment, the lower link failure including a failure related to the lower link optical interface device and a failure related to an optical link between the lower link optical interface device and the network duplication-dedicated optical interface device, and
wherein, when the lower link failure is detected by the lower link monitoring unit, the line control unit switches the optical signal transmission/reception path with respect to the upper network equipment from the first transfer network equipment to the second transfer network equipment.

8. The optical network system of claim 7, wherein the lower link monitoring unit detects the lower link failure based on at least one of a degree of physical optical loss of the reception signal and whether a synchronization signal for maintaining synchronization between the upper network equipment, the first and second transfer network equipment, and the lower network equipment is received.

9. The optical network system of claim 8, wherein the synchronization signal is a network timing packet (NTP) or a K28.5 code.

10. The optical network system of claim 7, wherein the lower link monitoring unit further detects the transfer network equipment failure based on whether a source is identical to a destination in a MAC address of the reception signal, and
wherein, when the transfer network equipment failure is detected by the lower link monitoring unit, the line control unit switches the optical signal transmission/reception path with respect to the upper network equipment from the first transfer equipment to the second transfer network equipment.

11. An optical interface device mounted on a transfer network equipment for connecting an upper network equipment and a lower network equipment through optical links, comprising at least one processor and at least one memory to implement:
an upper link monitoring unit configured to detect at least one of an upper link failure and a transfer network equipment failure based on a reception signal received from the upper network equipment, the upper link failure including a failure related to an upper optical interface device of the upper network equipment and a failure related to an optical link between the upper optical interface device and the optical interface device, and the transfer network equipment failure including a failure related to a MAC address error generated at the transfer network equipment; and
a control unit configured to generate a report signal based on a detection result of the upper link monitoring unit,
wherein the report signal is transmitted to the lower network equipment so that the lower network equipment switches an optical signal transmission/reception path with respect to the upper network equipment from the transfer network equipment to another transfer network equipment in response to the report signal.

12. The optical interface device of claim 11, wherein the upper link monitoring unit detects the upper link failure based on at least one of a degree of physical optical loss of the reception signal and whether a synchronization signal for maintaining synchronization between the upper network equipment, the transfer network equipment, and the lower network equipment is received.

13. The optical interface device of claim 12, wherein the synchronization signal is a network timing packet (NTP) or a K28.5 code.

14. The optical interface device of claim 11, wherein, when the transfer network equipment failure is detected by the upper link monitoring unit, the control unit stops transmission and reception of an optical signal to and from the upper network equipment.

15. The optical interface device of claim 14, wherein, when the transfer network equipment failure is detected by the upper link monitoring unit, the control unit transmits the report signal to the upper network equipment through an optical transmitter of the optical interface device.

16. A network duplication-dedicated optical interface device mounted on a lower network equipment, which is connected to an upper network equipment through first and second transfer network equipments respectively via independent optical links, comprising at least one processor and at least one memory to implement:
a first optical transceiver for transmitting and receiving an optical signal to and from the first transfer network equipment;
a second optical transceiver for transmitting and receiving an optical signal to and from the second transfer network equipment;
a lower link monitoring unit configured to detect a lower link failure based on a reception signal received at the first optical transceiver from the upper network equipment through the first transfer network equipment, the lower link failure including a failure related to an optical link between the first transfer network equipment and the first optical transceiver; and
a line control unit configured to switch an optical signal transmission/reception path with respect to the upper network equipment from the first optical transceiver to the second optical transceiver,
wherein the line control unit further configured to switch the optical signal transmission/reception path with respect to the upper network equipment from the first optical transceiver to the second optical transceiver in response to a report signal related to an upper link failure,
wherein the report signal received at the first optical transceiver from the first transfer network equipment, and
wherein the upper link failure includes a failure related to an optical interface device of the upper network equipment and a failure related to an optical link between the optical interface device of the upper network equipment and the first transfer network equipment.

17. The network duplication-dedicated optical interface device of claim 16, wherein each of the first and second optical transceiver is manufactured as a bi-directional type in which an optical transmitter and an optical receiver are integrated into one body.

18. The network duplication-dedicated optical interface device of claim 16, wherein the lower link monitoring unit detects the lower link failure based on at least one of a degree of physical optical loss of the reception signal and whether a synchronization signal for maintaining synchronization between the upper network equipment, the first and second transfer network equipment, and the lower network equipment is received.

19. The network duplication-dedicated optical interface device of claim 16, wherein the lower link monitoring unit further detects a transfer network equipment failure, which is including a failure related to a MAC address error generated at the first transfer network equipment, based on whether a source is identical to a destination in a MAC address of the reception signal, and
wherein, when the transfer network equipment failure is detected failure is detected by the lower link monitoring unit, the line control unit switches the optical signal transmission/reception path with respect to the upper network equipment from the first optical transceiver to the second optical transceiver.

* * * * *